United States Patent [19]

Kikinis

[11] Patent Number: 5,717,570
[45] Date of Patent: Feb. 10, 1998

[54] ENHANCED MINI-TOWER COMPUTER ARCHITECTURE

[75] Inventor: Dan Kikinis, Saratoga, Calif.

[73] Assignee: Elonex I.P. Holdings Ltd., London, United Kingdom

[21] Appl. No.: 540,437

[22] Filed: Oct. 6, 1995

[51] Int. Cl.⁶ .................................. G06F 1/16; H05K 5/00
[52] U.S. Cl. ..................... 361/685; 361/683; 312/223.2
[58] Field of Search ........................... 312/223.1, 223.2, 312/223.3; 361/724–727, 679, 683, 684, 685, 686, 687; 364/708.1; G06F 1/16

[56] References Cited

U.S. PATENT DOCUMENTS

| | | | |
|---|---|---|---|
| 5,031,070 | 7/1991 | Hsu | 361/683 |
| 5,124,885 | 6/1992 | Liu | 361/683 |
| 5,136,465 | 8/1992 | Benck et al. | 361/687 |
| 5,208,722 | 5/1993 | Ryan et al. | 360/99.01 |
| 5,397,176 | 3/1995 | Allen et al. | 312/223.2 |
| 5,417,012 | 5/1995 | Brightman et al. | 49/382 |

FOREIGN PATENT DOCUMENTS 236799 9/1987 European Pat. Off. ............... 361/686

Primary Examiner—Leo P. Picard
Assistant Examiner—Lynn D. Feild
Attorney, Agent, or Firm—Donald R. Boys

[57] ABSTRACT

A computer enclosure has a drive bay for multiple hard disk drives implemented in the rear panel rather than in the front as is conventional, providing sufficient storage capacity for use as a file server in a mini-tower architecture. In an alternative embodiment side panels are designed for quick removal by moving a panel against a spring element for release. In one embodiment access to the drive bay in the rear panel is controlled by a security door with a lock, and security screws for the removable side panels are located behind the security door. In another embodiment, a fan bracket is provided allowing a single fan to be located in different positions, or for multiple fans to be used. Fans may be easily added or replaced without powering down the computer, and provision is made in the fan bracket for mounting a speaker for the system.

6 Claims, 4 Drawing Sheets

ENHANCED MINI-TOWER COMPUTER ARCHITECTURE

FIELD OF THE INVENTION

The present invention is in the field of personal computers, and relates in particular to structure and architecture for such computers.

BACKGROUND OF THE INVENTION

The evolution of personal computer (PC) technology began with the basic International Business Machines (IBM) PC, which was designed with technical compromises that made it economical for personal use, but also gave it limited capability. However, either ingeniously or by accident, this original IBM PC was designed without any particular purpose in mind. That lack of purpose allowed this simple PC creation to grow into a true general-purpose computing instrument, with millions sold worldwide every year and used by millions of people in an seemingly unlimited variety of disciplines.

From this first IBM PC to current state-of-the-art personal computers, a continuing trend has been to build faster computers with more features and greater storage capacity, meeting increasingly complex processing demands and manipulating increasingly larger files. Other trends are to package greater numbers of special processing circuity, such as VGA cards, sound cards, game cards, random access memory (RAM), floppy drives, modems, and the like, into a PC. The personal computer industry has been meeting these steadily increasing demands while still providing the small, compact design that PC users have come to expect.

To meet consumer demands, PC enclosure architecture evolved from the well-known horizontally configured IBM PC/XT and AT-style enclosures to a structure designed to stand upright on the floor next to or even under a desk, instead of upon the desk. The motivation was increasing size of the enclosure to meet needs for more and more components, in conflict with premium desk space. This new, upright architecture is called a tower architecture, and has become a common practice for workstations, network servers, and the like.

Given the tower architecture, manufacturers soon discovered that smaller versions were perfectly adequate for many personal units, and a smaller version became common, now termed mini-tower architecture.

An advantage of a PC mini-tower enclosure is that its geometric shape lends it to greater expandability than a horizontally-styled enclosure. Also, all other characteristics being equal, upright configuration uses less floor or desk space than a horizontally-styled IBM PC/XT or AT PC enclosure.

There are limitations, however, in current PC mini-tower enclosure design for meeting increasing demands for greater expandability. For example, a current trend in the art is to use. PCs not only as a stand-alone computers, but also as file servers; A desirable feature of a PC-based file server is that it allows real-time interface between other PCs without going through a centralized file server, such as a local area network (LAN), where a malfunction can impair interface within an entire network.

Another desirable feature of a PC-based file server is that its hard disk drives can be readily installed or removed to adjust for fluctuating operational requirements and for maintenance without turning off power to the PC. This reduces PC down time and subsequent interference with normal file-server interface activity with other PCs.

In current PC mini-tower architecture, all drive bays and user interfaces associated with the enclosure, such as LEDs and switches, are located on the front panel, or face, of the enclosure. The rear panel is typically a plain surface, expected to be hidden, and dedicated to connections such as phone lines, serial and parallel ports, and the like, which, after initial connection, are accessed only infrequently, and then only when there is a malfunction or a system is being reconfigured or upgraded.

The front-panel/back-panel tradition for mini-tower (and tower) architecture imposes a severe limitation. For example, it has become desirable, as described above, to use PCs as file servers, or, in some instances, to provide stand-alone system with maximized storage capacity, accomplished with added HDDs. The front-panel/back-panel tradition provides limited space on the front of current PC mini-tower enclosures for adding additional HDDs.

What is clearly needed is a new approach to tower architecture, including an apparatus and method for providing greater front-panel-type area for interfaces such as expansion of HDD capacity within a PC mini-tower enclosure. Such an apparatus and method would desirably include a tamper-resistant capability to install and remove HDDs without disrupting normal PC and file server operations. Such an apparatus and method would desirably also include a provision to adapt cooling capacity to meet variations in cooling requirements caused by the number and types of components within different a PC mini-tower configurations.

SUMMARY OF THE INVENTION

In a preferred embodiment of the present invention a mini-tower computer having an enclosure with a front panel and a rear panel is provided, comprising floppy drive bays and status LEDs located in the front panel; at least one power connector, serial and parallel port mounted in the rear panel; expansion slots opening through the rear panel; and an array of hard disk drive (HDD) bays opening to the rear panel. In one embodiment the computer has a locking security door covering the array of HDD bays opening to the rear panel. In yet another embodiment the computer has side panels mounted by tabs inserted into openings, wherein the panels are held in place by a spring dement. Security screws are provided in one embodiment behind the security door and bearing on the side panels to prevent removal by unauthorized persons.

In an alternative embodiment a computer according to the invention has a snap-in fan bracket having snap-in ports for two electric fans, wherein one fan may be located in either position or two fans may be installed for enhanced cooling capacity. In another embodiment a port is provided for mounting a speaker.

A mini-tower computer according to the invention provides maximized HDD capacity to the extent that such a mini-tower may be used as a file server in a network, or as a very high-capacity stand-alone unit for applications requiring extended storage capacity. The unique architecture also provides for quick access to internal elements, and for versatile fan cooling, wherein a fan may be located in alternative positions, or two or more fans may be used.

DESCRIPTION OF THE PREFERRED EMBODIMENTS

The present invention in various embodiments provides for expansion of memory capacity in a PC mini-tower beyond what is possible in a conventional mini-tower design, providing for potential use as use as a file server and to meet increasing demands for storing and executing additional and more complex software.

In an embodiment of the present invention, in addition to interface elements on a front face, such as floppy drive bays, on-off switch, and status LEDs, apparatus for installing several HDDs is located in the rear panel area of a PC mini-tower enclosure. The rear panel area of a PC mini-tower enclosure is an ideal position to interface additional HDDs, because that area is typically not fully utilized, and therefore has available panel space and enclosure volume behind the panel space. Also in an embodiment of the invention apparatus and method is provided to adjust cooling fan location and capacity, and to remove and replace a speaker, and to provide simple, secure, access to internal components of the PC mini-tower enclosure.

Figures 1A, 1B:
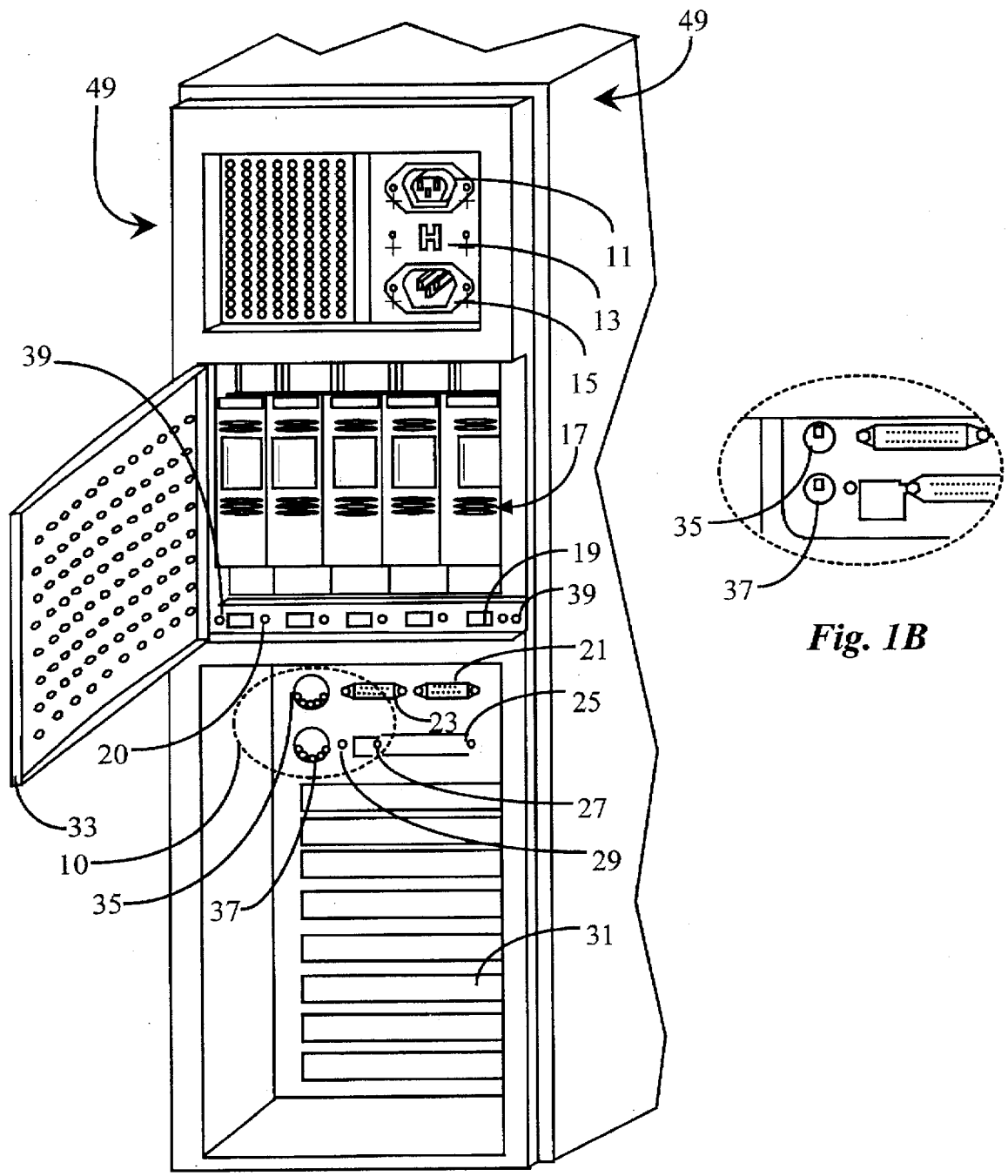
FIG. 1a is an isometric view of a rear panel of a PC mini-tower according to an embodiment of the present invention.
FIG. 1B is an enlarged view of a section of FIG. 1A.

FIG. 1A is an isometric view of a rear panel of a PC mini-tower according to an embodiment of the present invention. There are, as is more-or-less conventional for most systems, an alternating current (AC) outlet 11 for powering peripherals, such as a monitor, a voltage selection switch 13, a main AC power input 15, serial ports 21 and 23, a parallel port 25, uninterruptable Power switch dual in-line package (UPSDIP) 27, a UPS port 29, a series of expansion slots 31, a keyboard connector 35, and a mouse connector 37.

In the embodiment of the present invention shown in FIG. 1A, five drive bays are provided on the rear panel for mounting HDD assemblies 17. There could be more or fewer than five such bays. In some embodiments (optional) elements are provided for the bays to be a hot-plug SCSI drive array. The drive bays are secured behind a locking security door 33. In the SCSI option, SCSI power buttons, such as button 19, with light-emitting diodes (LED) 20, are provided immediately below each bay to turn HDD power on and off to facilitate insertion and removal of one or more of HDD assemblies 17 without mining off a PC's main power. This is commonly referred to as hot-swapping in the art.

In an alternative embodiment of the present invention sidewall covers 49 are mounted in a manner that allows quick access to internal components. For security purposes sidewall security screws 39, one for each of left and right sidewalls 49, are provided behind locking security door 33. The sidewall security screws must be withdrawn before sidewalls 49 can be removed.

Figure 2:
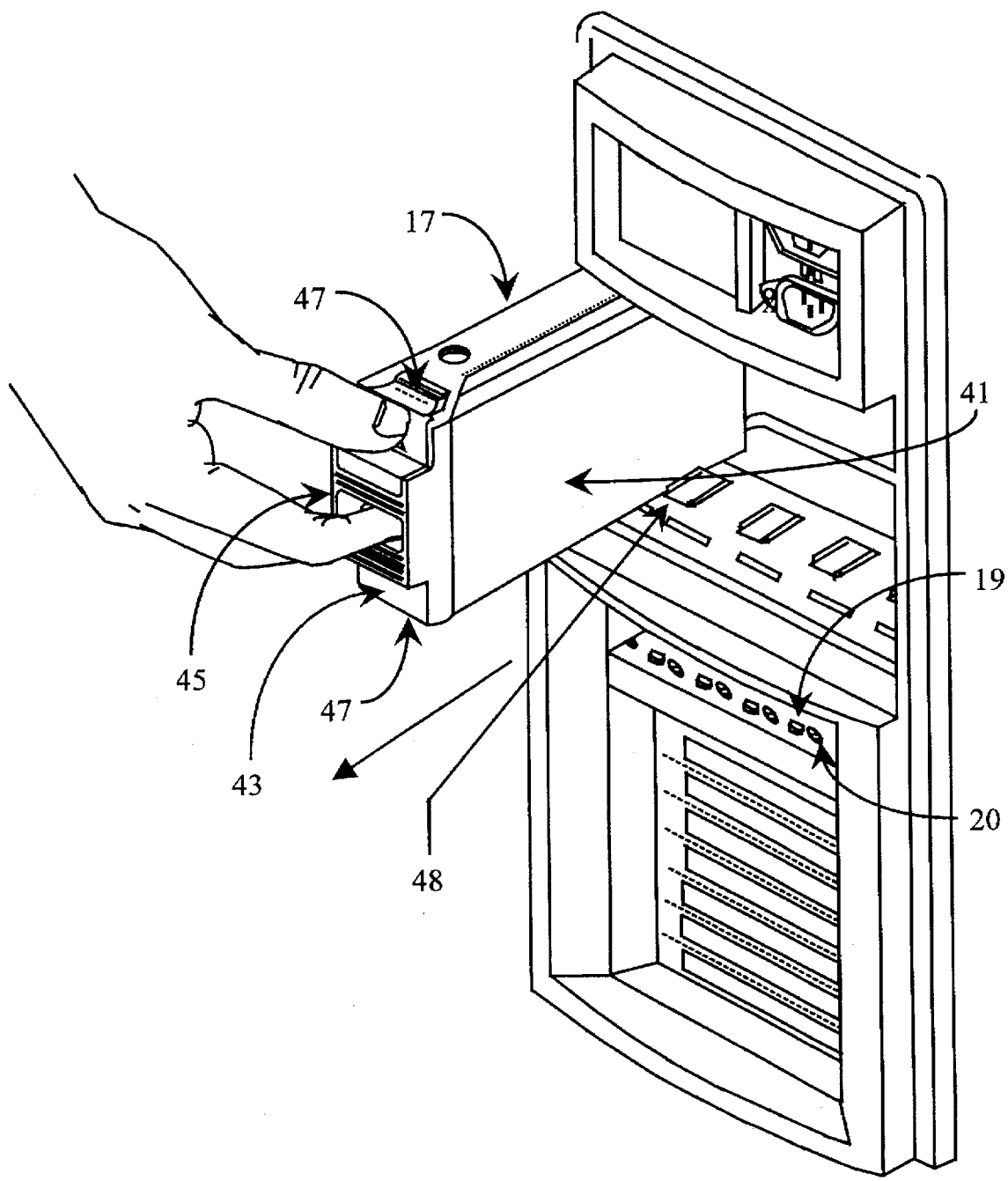
FIG. 2 is an isometric view of the rear panel of a PC mini-tower showing apparatus and method for removing and installing disk drives according to an embodiment of the present invention.

FIG. 2 is an isometric view of the rear panel of a PC mini-tower showing apparatus and method for removing and installing disk drives according to an embodiment of the present invention. To install HDD assembly 17, a user first depresses SCSI power button 19 under the applicable docking bay 48. This turns off power to an SCSI HDD back-plane connector, not shown but well-known in the art, into which an HDD assembly is to be connected. The applicable LED 20 will extinguish to verify that the HDD power has been removed.

HDD assembly 17 includes HDD 41 attached to a mounting bracket 43, which has a pinch-release mechanism 45 with spring-loaded tabs 47. Spring-loaded tabs 47 are made so they latch into detents on the top and bottom of an HDD docking bay 48 when HDD 41's connector is securely mated to an SCSI back-plane connector. The appropriate SCSI power button 19 is then depressed to turn HDD power on to allow normal operation of newly installed HDD 41. LED 20 lights when power is applied to indicate that the drive power has been restored to HDD 41. To remove an HDD assembly the process described above is simply reversed The art of mounting and fastening is well-developed and there are many ways that HDDs can be mounted in a rear panel of a PC mini-tower enclosure to satisfy the spirit and intent of the present invention. For example, the description above shows installation of 5 HDDs in a rear panel of a PC mini-tower. Other embodiments may have a rear panel architecture that will hold more, or less, than 5 HDDs. In another example, there are many ways, other than the one described above, that an HDD can be mounted in the rear of a PC mini-tower, such as a key latching mechanism, screws or bolts, and zeus fasteners. In still another example, hot-swapping of HDDs is well-known in the art, and there are many ways to protect an HDD and associated circuits from a power surge during installation or removal, other than the one described above, without departing from the requirements of the present invention.

A problem in current PC mini-tower architecture is that access to HDD assemblies 17 and other components through its rear panel and sidewalls is relatively easy. Such access is typically accomplished by merely removing or loosening screws, or the like, on an HDD bracket or enclosure sidewall, and simply removing the HDD or sidewall. This situation makes HDDs and other internal components in a PC mini-tower a tempting target for intruders. The present invention solves this problem with a combination of a locking rear-panel security door which encloses and limits access to HDD assemblies 17 and with sidewall security screws 39.

Figure 3:
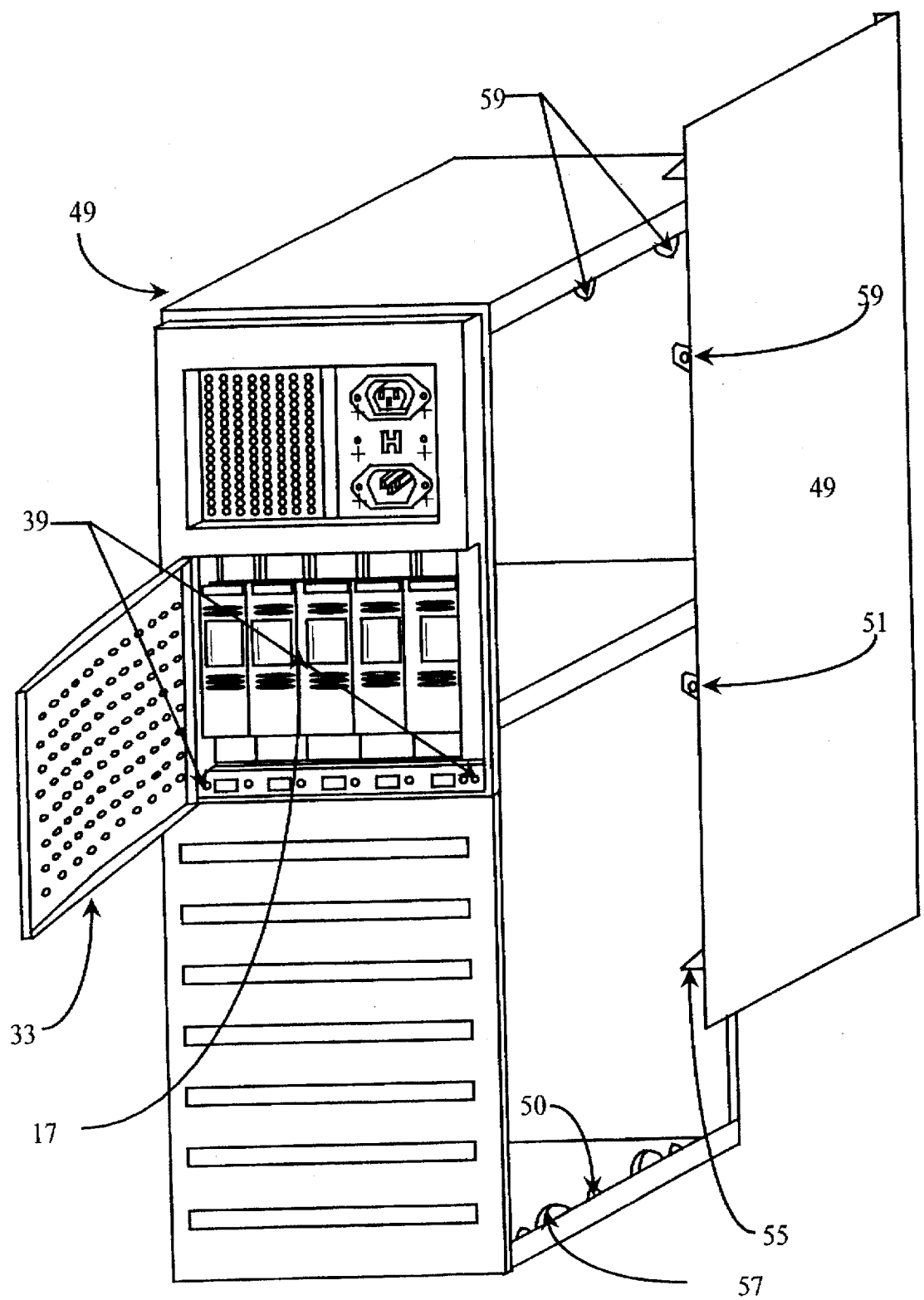
FIG. 3 is an isometric view from the rear of a PC mini-tower according to an embodiment of the present invention showing an apparatus and method for removing and installing a secure sidewall.

FIG. 3 is an isometric view of an embodiment of the present invention wherein locking rear-panel security door 33 has a key or combination lock, or any other suitable latch and lock mechanism, to secure it to a mini-tower enclosure. With security door 33 latched and locked, access to HDD assemblies 17 and sidewall security screws 39 is restricted to authorized persons. With access to sidewall security screws 39 thus restricted, sidewalls 49 cannot be removed and unauthorized access to other components within a PC mini-tower enclosure is discouraged.

Sidewall security screws 39 are accessible only when security door 33 is unlocked and open. Security screws 39 are provided to hold left and right sidewalls 49 in place by fitting through threaded screw holes in an enclosure frame 52 and tabs 51. Other tabs 59, similar to tabs 51, but without a screw hole, are located at various positions on sidewalls 49 and enclosure frame 52. Tabs 59 are shaped to mate with adjacent tab inserts, not shown, on enclosure frame 52 and sidewalls 49. When all tabs are thus mated and sidewall security screws 39 are inserted into tabs 51, all four edges of sidewall 49 are securely held in position relative to frame 52. Springs 57 help hold the sidewalls in position by pushing upward against a horizontal sidewall stiffening frame member 55.

In another example, fastening security tab 51 to PC mini-tower frame 52 can be accomplished in other ways than with security screws 39. Some other ways are, but not limited to, locks and latches, zeus fasteners, spring-loaded pins, and levered cams. Another embodiment may use connecting rods to control latches on security tab 51 and some, or all, of tabs 59 in a manner that secures sidewalls 49 in position. This, or a similar method, would meet the requirements of the present invention as long as the mechanism for controlling the connecting rods is locked behind security door 33.

Another problem in current PC mini-tower architecture is that increases in the number of HDDs, computer processing units (CPU), and other components also increases the amount of heat dissipated inside an enclosure. A requirement for greater cooling capacity to protect a CPU becomes more critical as heat inside a PC mini-tower enclosure increases. Cooling fans, being the heart of a PC cooling system must therefore be located so they have maximum effect on cooling a CPU, and desirably in a manner that fans may be easily added and deleted.

Still another problem in current PC mini-tower architecture, caused by packaging an increasing number of components into an enclosure, is that common components, such as a speaker, get crowded out for lack of space. Speakers are an important feature of a typical PC mini-tower enclosure. Speakers provide audible signals, such as beeps for getting a user's attention to warn of an error, indicate ongoing processing activity, indicate the completion of a task, and to provide an audio output for speech synthesis. Those working in the art of PC mini-tower design architecture often need to make compromises to allow room for a speaker.

In an embodiment of the present invention, an apparatus and method is provided to facilitate adding, removing, and relocating cooling fans to accommodate changes in cooling requirements and CPU location. This apparatus and method also provides easy installation and removal of a speaker in a PC.

Figure 4:
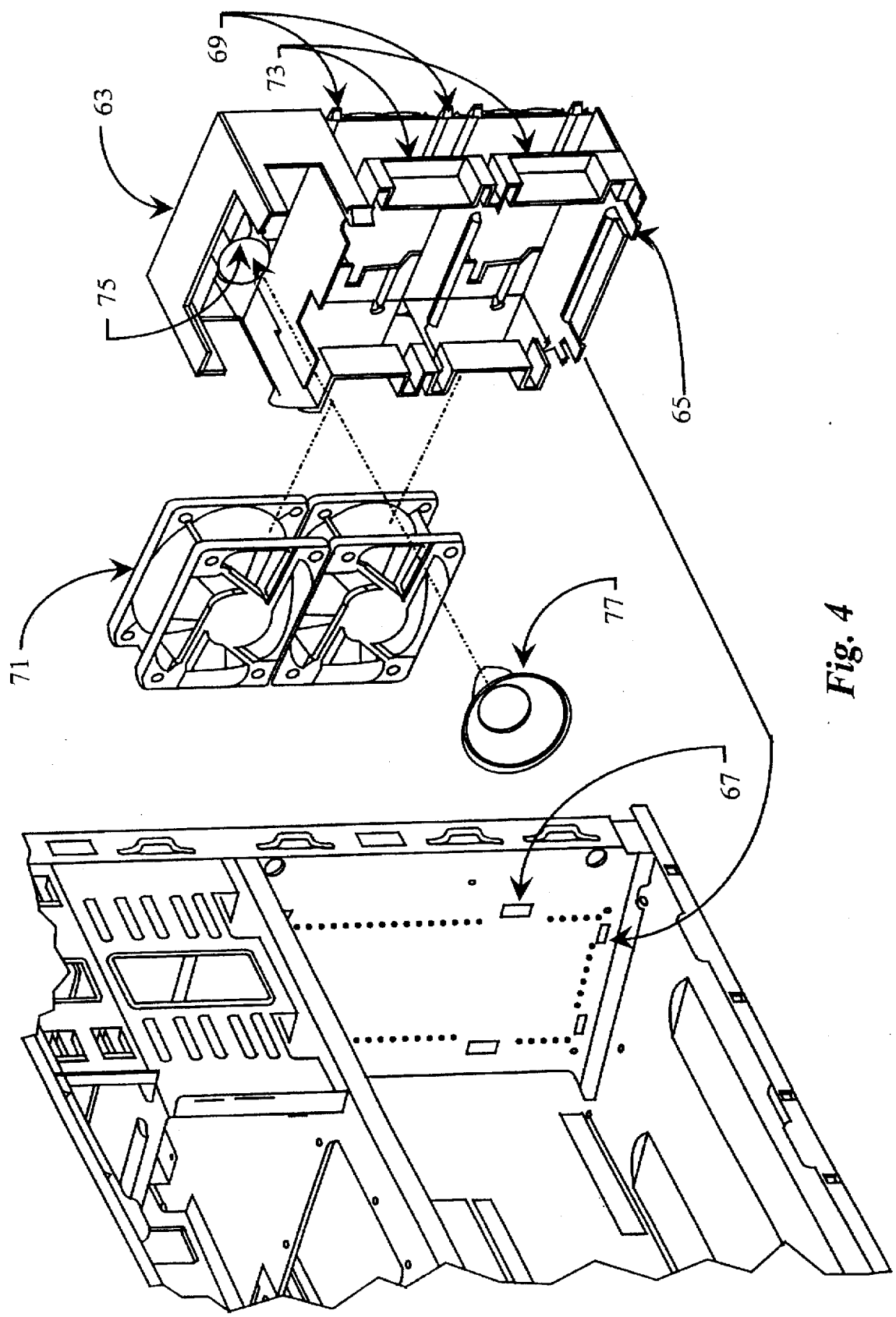
FIG. 4 is an exploded view of a portion of a mini-tower according to an embodiment of the present invention showing a versatile apparatus for a speaker and cooling fans.

FIG. 4 is an exploded view of a mini-tower PC according to an embodiment of the invention showing a cooling fan and speaker housing 63 that is screwless, boltless, and vertically reversible. Cooling fan and speaker housing 63, hereinafter housing 63, includes snap-in tabs 65 on one end and sides in a manner to mate with housing tab receptacles 67 on the PC mini-tower enclosure. Snap-in tabs 65 and receptacles 67 are aligned symmetrically in a vertical and horizontal plane so that housing 63 may be mounted in either one of two vertical positions. In this way, a fan can always be placed close to a CPU, no matter where the CPU is located on the motherboard.

Housing 63 is designed with snap-in tabs 69 for securing one ar two fans 71 in housing 63. A fan 71 can be inserted from either side of housing 63 and is provided with power lines and connectors, not shown, to connect to a power source.

It is not necessary to turn PC power off to insert or replace a fan. It is only necessary to unplug fan 71 power connectors from a power source, depress the fan snap-in tabs 69 to disengage, and slide the fan out of socket 73. Then a new fan may be plugged into a power source and slid into socket 73 until firmly latched by snap-in tabs 69. Housing assembly 63 can hold two fans to accommodate a demand for greater cooling requirements such as providing cooling for more than one CPU.

Also in an embodiment of the present invention, housing assembly 63 also has a speaker socket 75, fitted with a suitable fastening device, such as a rubber grommet or o-ring on its inside circumference, to hold a speaker 77 securely in position. It is not necessary to turn PC power off to replace a speaker. It ius necessary to unplug speaker 77 signal connectors, not shown, and pull the speaker out of socket 75. One may then connect a new speaker 77 to a signal source and push it into socket 75.

Snap-in tabs 69 and housing snap-in tabs 65 could be screws, spring-loaded pins, cam-latching assemblies or a number of other latching mechanisms known in the art. As another example, speaker 77 can be held in place also by a retaining ring, set screws, snap-in tabs, or the like. As a final example, although fan and speaker housing 63 is shown in FIG. 4 as mounted into a rear panel of a PC mini-tower enclosure, housing 63 can be mounted anywhere on a PC enclosure as determined by those skilled in the art, regardless of the type, without departing from the spirit and scope of the present invention.

There is no attempt in the drawings to provide exact detail of the embodiments of the present invention described herein. Given the design of a rear panel to configure hot-swapping HDDs, locking door and sidewall fastening, plus a fan and speaker housing that can be located anywhere on a PC enclosure, the design architecture of an enhanced PC mini-tower enclosure represents a unique departure from conventional practice.

It will also be apparent to those with skill in the art that there are many possible alterations other than the examples already described that might be made in other embodiments of the present invention without departing from the spirit and scope of the invention. Many alternatives have been mentioned. As an example of further detail that may be altered without departing from the spirit and scope of the invention, the features of the invention, including rear-mounted HDDs, a security door over the rear-mounted drive bay, easily removable side panels, security screws for the side panels behind the security door, a dual fan housing wherein one or two fans may be snapped into place, and so on, may be readily applied to full tower architecture and other enclosure designs as well as to a mini-tower as described in the embodiments above.

What is claimed is:

1. A mini-tower computer having an enclosure with a front panel and a rear panel, comprising:

floppy drive bays and status LEDs located in the front panel;

at least one power connector, serial and parallel port mounted in the rear panel;

expansion slots opening through the rear panel;

an array of Small Computer System Interface (SCSI) hot-plug hard disk drive (HDD) bays opening to the rear panel; and a SCSI power button having an internal LED associated with each bay in the array of SCSI drive bays;

wherein power may be removed from each power bay with the associated SCSI power button without turning off main PC power.

2. A mini-tower computer as in claim 1 further comprising a locking security door covering the array of SCSI hot-plug HDD bays opening to the rear panel.

3. A mini-tower computer as in claim 2 additionally comprising side panels mounted by tabs inserted into openings, wherein the panels are held in place by a spring element.

4. A mini-tower computer as in claim 3 further comprising security screws locking the side panels in position, the security screws located behind the locking security door.

5. A mini-tower computer as in claim 1 further comprising a snap-in fan bracket having snap-in ports for two electric fans, wherein one fan may be located in either position or two fans may be installed for enhanced cooling capacity.

6. A mini-tower computer as in claim 5 wherein the snap-in fan bracket has a port for mounting a speaker.

* * * * *